United States Patent [19]

Finkelstein

[11] E Re. 28,710

[45] Reissued Feb. 10, 1976

[54] ELECTRICAL HARNESS WITH MOLDED SOCKETS

[76] Inventor: Laurence Stephen Finkelstein, 42 Lyncroft Road, Montreal, Quebec, Canada

[22] Filed: Mar. 18, 1974

[21] Appl. No.: 452,115

Related U.S. Patent Documents

Reissue of:

[64] Patent No.: 3,716,818
Issued: Feb. 13, 1973
Appl. No.: 100,342
Filed: Dec. 21, 1970

[52] U.S. Cl. ..... 339/97 L; 339/117 R; 339/119 L; 339/218 L

[51] Int. Cl.[2] ..... H01R 9/08

[58] Field of Search ..... 339/97, 99, 117, 119, 218

[56] References Cited

UNITED STATES PATENTS

| | | | |
|---|---|---|---|
| 3,128,141 | 4/1964 | Krupp et al. | 339/97 L |
| 3,416,124 | 12/1968 | Irvine | 339/117 R |
| 3,597,725 | 8/1971 | Beck | 339/97 L |

*Primary Examiner*—Joseph H. McGlynn

[57] ABSTRACT

A moulded socket for electric lamp bulbs comprising a hollow cylindrical body and an open end. An electrical cable is moulded within a base formed integrally with the cylindrical body. A center metal contact is partly moulded within the base and held at the center of the socket over the base. A U-shape metal side contact having two opposed sides and a connecting base is also partly moulded within the cylindrical body and adapted to receive and retain a lamp bulb screw base between the opposed sides. Points are formed with the contacts to penetrate the insulation on the electrical cable to make electrical connection with a respective wire. The base of the socket is provided with ventilating holes and guide ribs are formed in the inner surface of the cylindrical body to guide a screw base in the socket and to provide sufficient ventilation thereabout. A holding clip is also moulded, at one end thereof, within the socket base.

5 Claims, 10 Drawing Figures

INVENTOR
Laurence S. FINKELSTEIN
Allan Sinsky
ATTORNEY

INVENTOR
Laurence S. FINKELSTEIN

Allan Sivsky
ATTORNEY

ELECTRICAL HARNESS WITH MOLDED SOCKETS

Matter enclosed in heavy brackets [ ] appears in the original patent but forms no part of this reissue specification; matter printed in italics indicates the additions made by reissue.

BACKGROUND OF INVENTION

1. Field of Invention

The present invention relates to sockets for electric lamp bulbs and more particularly to sockets moulded on an insulated conductor cable, and a method and apparatus for moulding the sockets on the cable.

2. Description of Prior Art

Electrical lamp sockets known to date include a socket housing having therein a metallic cylindrical cup, the side walls of which are threaded to permit the screwing of the base of an electrical light bulb therein. At the center of this cup is a central contact which is insulated from the side walls and connects to the center contact of the lamp screw base, when a light bulb is retained in the socket, so that current will flow through the filaments of the light bulb via the cylindrical side wall and the central contact.

Other type lamp sockets of this class and more particularly of the type for use to string lights on an electrical cord, for decoration purposes, utilize a cylindrical plastic body having a metal cylindrical cup therein and having contacts as mentioned hereinabove. However, these contacts are each provided with an extension pin extending through the base into transverse cavities and protruding therethrough to provide contact with a respective insulated wire positioned and retained in each of the transverse cavities. A pair of wires is separated with each wire placed over a respective cavity and by inserting a bottom cap over the base of the cylindrical body, each of the wires are forced against a respective pin which penetrates the insulating coating and provides connection for the center contact and the side wall contact. Many of these types of lamp sockets have not proved entirely satisfactory for many reasons. Some of these reasons are that it is very expensive to produce because of time consuming manual operations, and excessive number of parts utilized in its construction. Also, the casing is generally formed of a brittle plastic material and breaks easily. Still further, many of these constructions do not provide proper ventilation and cause moisture to be trapped in the socket, thereby causing short circuits and destroying the light bulbs and sometimes the socket contacts.

SUMMARY OF INVENTION

It is an object of the present invention to provide a moulded electrical lamp socket which substantially overcomes all of the above disadvantages.

Accordingly, from one aspect, the present invention relates to an electrical lamp socket or lamp bulbs having a screw base, the lamp socket comprising a hollow cylindrical body having an open end and closed at the opposite end by a socket base integrally moulded with the cylindrical body. An electrical cable, having two insulated conductor wires, is moulded within the socket base. A center metallic contact having a contacting portion is disposed substantially at the center of the inner face of the socket base and is retained in the base portion of the socket by moulding a retaining base portion integrally formed with the contacting portion and moulded within the socket base to rigidly secure the center contact in the lamp socket. A point is provided in the lower edge of the retaining base portion of the center contact and penetrates the cable to contact one of the two wires located in the cable. A metallic side contact of generally U-shaped configuration defining two opposed vertical sides and a connecting base is partly embedded within the hollow cylindrical body and is provided with undulations in the inner edge of the opposed vertical sides to engage and retain the screw base of a lamp bulb in the hollow cylindrical body. A point is also integrally formed in the lower edge of the connecting base and penetrates the cable to contact the other one of the two wires.

It is another object of the present invention to provide an improved method of manufacture whereby a substantial portion of the operations are automated to more rapidly produce a set of lamp bulb sockets.

Accordingly, from a further aspect, the present invention relates to a method of moulding electrical lamp sockets on an electrical cable having two insulated electrical conductors therein comprising the steps of feeding a bar having one or more mould cavities therein to an element insertion station and positioning a center contact, a side contact and a holding clip element in specific locations in each of a designated number of the cavities. Portions of a length of electrical cable are positioned over each of the mould cavities having elements therein. The bars with the positioned portions of the electrical cable are then fed to a moulding station where a thermoplastic material is injected in each of the mould cavities having a cable portion associated therewith. The moulded lamp sockets and cable portions are then extracted from the mould cavities.

It is a further object of the present invention to provide apparatus for moulding electrical lamp sockets on an electrical cable having two insulated electrical conductors therein.

The apparatus comprises means for feeding a bar having one or more mould cavities therein to element insertion apparatus. Means are also provided for positioning a center contact, a side contact and a holding clip in specific locations in each of a designated number of mould cavities. Means are also provided for positioning portions of the electrical cable over each of the mould cavities having a center contact, a side contact and a holding clip associated therewith. Means are further provided for feeding the bar, with the positioned portions of said electrical cable, to a moulding station where a thermoplastic material is injected in each of the mould cavities having a cable portion associated therewith. Still further, means are provided for extracting the moulded lamp sockets and cable portions from the mould cavities.

BRIEF DESCRIPTION OF DRAWINGS

The invention is illustrated, by way of example, in the accompanying drawings in which.

DESCRIPTION OF PREFERRED EMBODIMENTS

Figure 1:
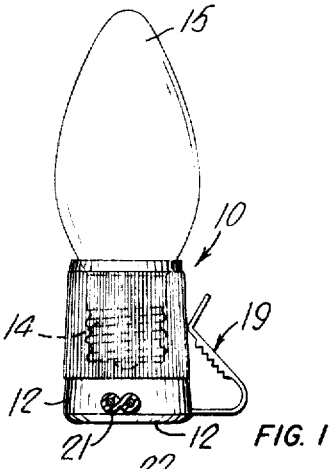
FIG. 1 is a side view of the lamp socket of the present invention, showing a lamp bulb therein.
Figure 2:
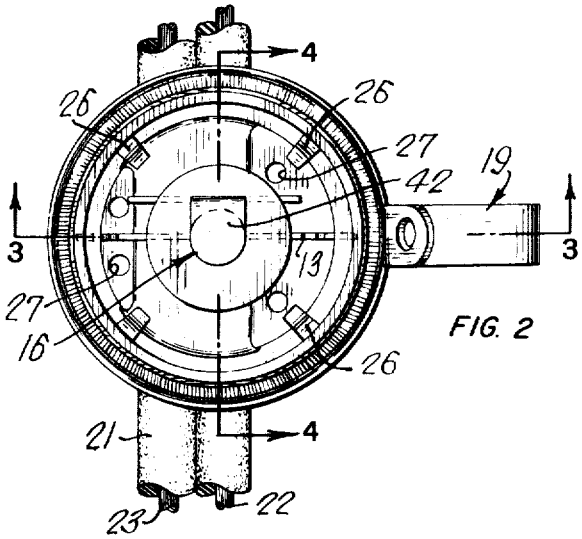
FIG. 2 is a top view of the lamp socket.

Referring now to the drawings, and more particularly to FIGS. 1 to 8, there is shown a unitary lamp socket 10 having a hollow cylindrical body 11 defining an integral socket base 12 at the bottom thereof. Within the hollow cylindrical body 11 there is partly embedded a side contact member 13 of substantially U-shaped configuration so as to retain the screw base 14 of a light bulb 15 screwed therein. Centrally located in the base 12 and partly embedded therein is a center contact 16. The center contact 16 has a contacting portion 42 which protrudes and lies above the interior surface of the socket base 12 to provide a connection with the screw base center contact 18 located at the bottom of the screw base 14 of the light bulb 15 when it is screwed in the lamp socket 10. Also secured, at one end, in the base of the lamp socket is a holding clip 19 made of spring steel and is held against the outer surface 20 of the cylindrical body 11 to position and retain the lamp socket 10 against a tree branch or various other elements depending on the use of the lamp socket 10.

Figure 5:
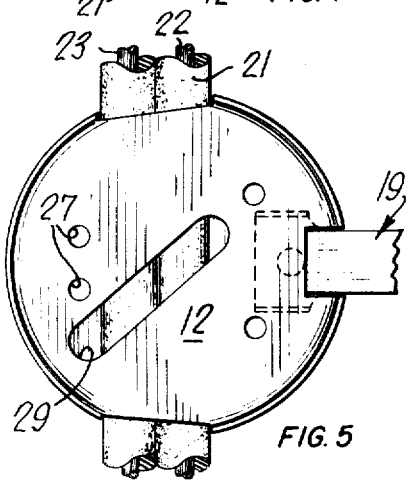
FIG. 5 is a bottom view of the lamp socket.

An electrical cable 21 having two insulated electrical conductor wires 22 and 23 embedded therein is integrally moulded in the socket base 12 of the lamp socket 10. The electrical cable 21 is positioned transverse to the longitudinal axis of the cylindrical body 11 and located such as to provide for alignment of the wires 22 and 23 with the points 24 or 25 of side contact 13 and center contact 16 of the lamp socket. In the inner wall of the socket are integrally formed a plurality of elongated guide ribs 26, disposed along the longitudinal axis of the socket 10, to assure that the light bulb screw base 14 is positioned centrally in the hollow cylindrical body 11 so as to achieve a good contact with the side contact 13 and the center contact 16. As can be seen from FIG. 2, there are four such ribs 26 positioned at 90° from each other. It can also be seen that the inner surface 28 tapers slightly outwardly to facilitate the insertion of a lamp bulb 15 therein and also to facilitate mould extraction. The outer surface 20 tapers slightly inwardly upwards to define an open end 30 of a diameter only slightly larger than that of the lamp bulb 15 adjacent thereto to provide ventilation therebetween. The taper on the outer surface also facilitates mould extraction and adds to the aesthetic of the socket 10. Referring to FIG. 5, it is seen that the contact base 12 is provided with a plurality of ventilating holes 27 therein which are used to provide proper ventilation of the hollow cylindrical lamp socket to remove any moisture or water that could seep or form between the inner surface 28 of the hollow cylindrical body 11 and the screw base 14 of its associated light bulb 15. The elongated angularly disposed recess 29 is formed by a stamping head (not shown) which presses the electrical cable 21 against the points 24 and 25 during the injection moulding stage of the process. When the stamping head forming part of the top section of the mould (not shown) is retracted the recess 29 is formed, similarly, the holes 27 are formed by pins (not shown) during the injection moulding stage.

Figure 6:
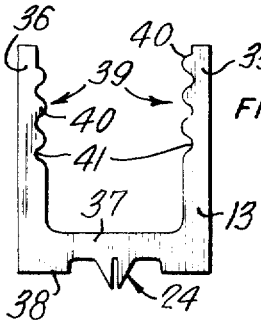
FIG. 6 is a side view of the side contact.

Referring more specifically to FIG. 6, there is shown the construction of the side contact 13 which is of substantially U-shaped configuration and comprises essentially two elongated vertical sides 35 and 36 and a connecting base 37. In the lower edge 38 of the connecting base portion is integrally formed a double point 24 which extends beyond the lower edge 38 and penetrates the insulation of the electrical wire cord 21, as can be seen from FIG. 3, to provide contact with one of the conductors, as shown, conductor 21. As can be seen, the side contact 13 is symmetrical about the central axis to provide certain advantages in the assembly of the lamp socket 10 as will be described later. The outer edge of the elongated vertical sides are relatively flat whilst the inner edge is provided with undulations 39. The undulations define a plurality of rounded peaks 40 and valleys 41, the peaks 40 on one elongated vertical side 36 being opposite to valleys 41 on the opposite vertical side 35. The side contact corresponds to a cross section along a diameter of a lamp socket adapted to receive a screw base therein. The tolerance of the peaks and valleys or undulations are such as to accept the screw bases of most manufactured lamp bulbs, taking into consideration the variations within the tolerances. The side contact 13 is stamped out from a flat sheet or strip of metal, such as brass (not shown). An advantage of having opposed elongated vertical sides 35 and 36 is that the lamp bulb screw base 14 is prevented from side or lateral displacement, thereby retaining the lamp bulb solidly in the cylindrical body 11 and ensuring a good contact between the side contact 13 and the screw base 14. As mentioned hereinabove, the side contact 13 is symmetrical about its central axis, thereby permitting reception of the member from either faces when feeding them to insertion apparatus (not shown) for locating in a mould (not shown). As seen from FIGS. 2 and 3, the vertical sides 35 and 36 are only partly moulded within the inner surface 28 of the cylindrical body whilst the connecting base 37 is substantially entirely embedded in the socket base 12.

Figure 7:
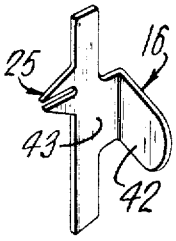
FIG. 7 is a perspective view of the center contact.
Figure 4:
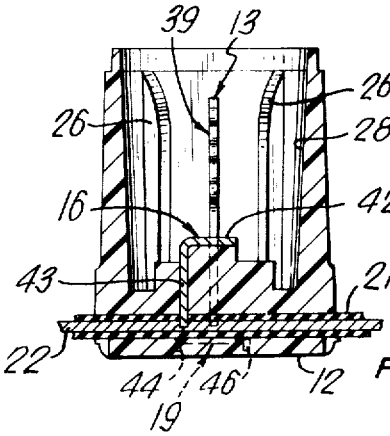
FIG. 4 is a cross-sectional view along cross-section lines IV—IV of FIG. 2.

Referring now to FIG. 7, there is shown the detailed construction of the center contact 16. The center contact 16 consists substantially of a member having two sections disposed at right angles to each other. The first section is a contacting portion 42 which is tongue shaped and provides the contact surface which connects to screw base center contact 18 of the light bulb 15. The second section, as can be seen, defines a retaining base 43 which is substantially wider than the contact section and which is embedded in the thermoplastic during the injection of the lamp socket 10. Thus, the center contact is rigidly secured in the socket base 12 and defines a central contact surface which lies flat and on the bottom of the hollow cylindrical body perpendicular to the longitudinal axis of the cylindrical body. A double point 25 is also provided integrally in the retaining base and extends beyond the lower edge of the base and to one side thereof so as to penetrate conductor wire 23 of the electrical wire cord 21 embedded in the socket base 12 of lamp socket 10. This contact is also stamped out of brass metal sheeting.

Figure 3:
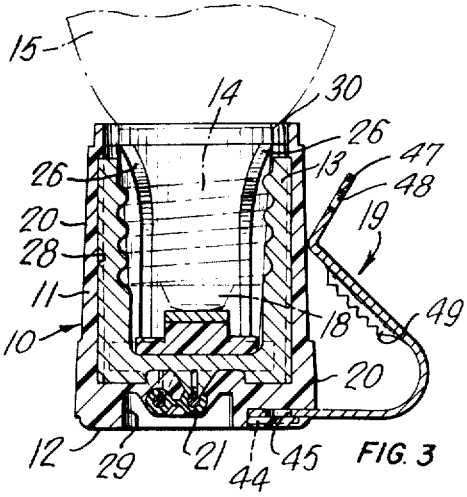
FIG. 3 is a cross-sectional view along cross-section lines III—III of FIG. 2.
Figure 8:
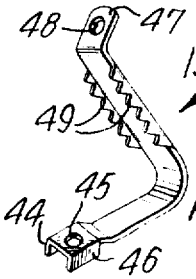
FIG. 8 is a perspective view of the holding clip.

Referring now to FIG. 8, there is shown the holding clip 19 which is also moulded at one end thereof within the lamp socket base 12 as shown in FIG. 3. The holding clip 19 has a specific configuration to retain the socket body 11 against a tree branch, or any other suitable members that the socket may be attached to. At the fixed end 44 of the holding clip 19 is provided a hole 45 and two flanges 46 extending at right angles to the plane of the holding clip 19 and on each side of the hole 45 at the end of the clip. The purpose of the hole 45 and the flanges 46 is to provide rigid anchoring points into the socket base 12 of the lamp socket, when the socket is moulded thereon. At the free end 47 of the holding clip there is provided an eyelet opening 48 which provides for insertion of a nail or other such fastening members therethrough to hold the lamp socket adjacent a surface to which said fastening means can fasten to. The free end 47 is also turned outwardly to provide ease of insertion and opening of the clip. Also, along a portion of the holding clip 19 and facing the outer surface 20 of the lamp socket 11 there is provided a serrated flange 49 on each edge of the holding clip. The purpose of these serrated edges 49 is to rigidly retain a member between the outer surface 20 of the lamp socket and the serrations. The holding clip 19 is formed of spring steel and is heat treated to provide adequate resiliency and longer life.

Figure 9:
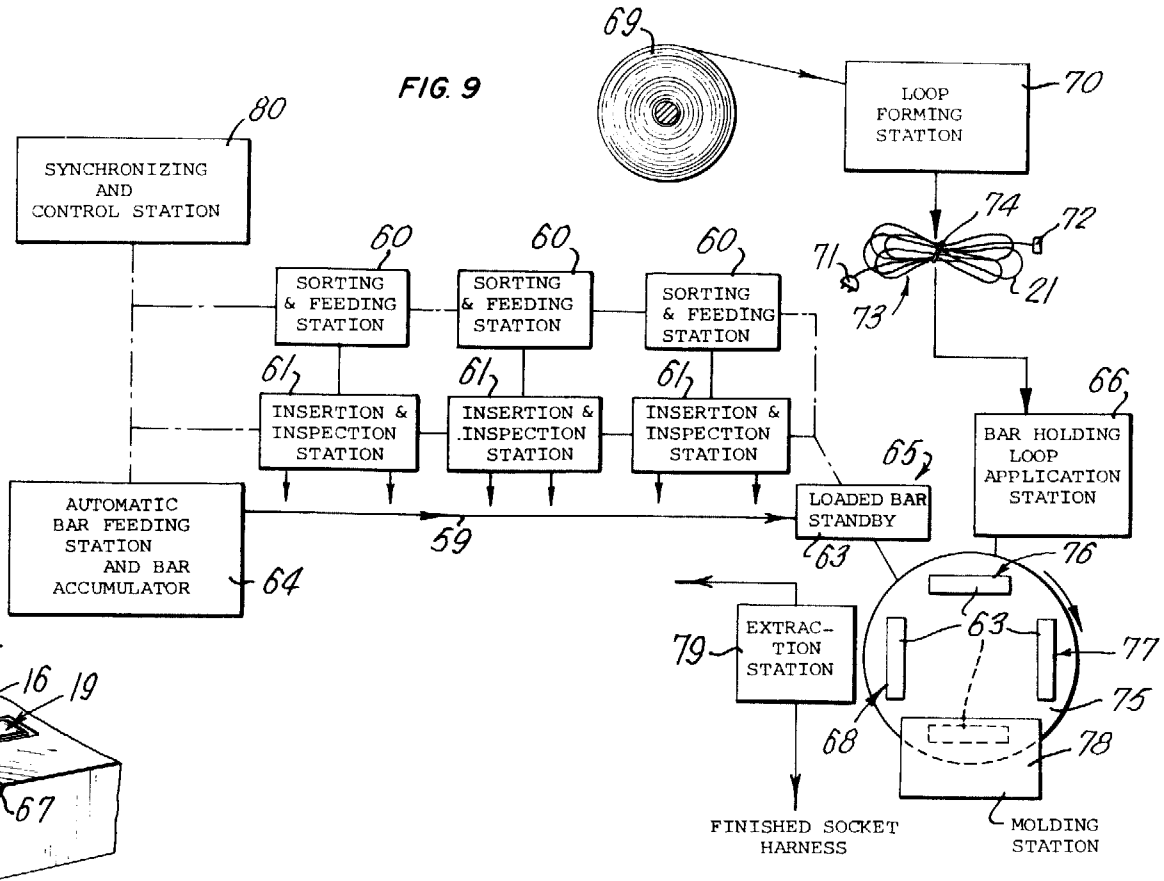
FIG. 9 is a flow diagram illustrating the method of assembly of the present invention.
Figure 10:
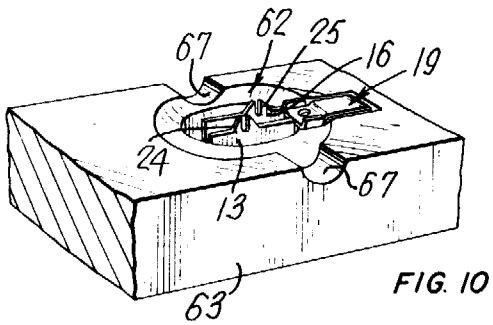
FIG. 10 is a portion of the block showing a lower mould cavity.

Referring now to the assembly diagram, FIG. 9, and with reference to FIG. 10 and the other figures, there is illustrated generally the method and apparatus for assembly of the integrally moulded lamp sockets 10 to thereby constitute a set of light bulb sockets 10. A plurality of side contacts 13, center contacts 16 and holding clips 19 are placed into a respective sorting and feeding station 60 where each of these elements are sorted and fed on supporting means (not shown) to a respective insertion and inspection station 61 where insertion apparatus picks up each of the elements, one at a time, and feeds them into a specific location in a lower mould cavity 62, a plurality of which are provided in a mould bar 63. The mould bars 63 are fed by conveying means 59 in synchronism to the insertion apparatus (not shown) of the station 61. Following the insertion apparatus is an inspection apparatus (not shown) which ensures that each of the elements is well located in its proper position. Therefore, as a bar 63 moves from an automatic feeding station 64 to the insertion and inspection stations 61, the side contacts 13, center contacts 16 and holding clips 19 are positioned in place and then the entire mould bar 63 is conveyed to a standby position 65, where the bar 63 is then transferred to a bar holding and loop application station 66. At station 66, portions of a looped two conductor wire cord 21 are placed over respective lower mould cavities 62 to which there is associated a guide cavity 67 to position the cord 21 (see FIG. 10).

In order to ensure that the lamp sockets 10 are positioned in substantially the correct position and substantially equidistantly spaced from each other along a length of electrical cord, the entire electrical cord 21 must arrive at the station 66 in a manner such as to readily identify the portions of the cord 21 which are to be positioned over the cavities 62. This identification is achieved as follows. A coil 69 of insulated electrical cord 21 feeds the input of loop forming station 70 where the cord 21 is cut to the proper length while stripping the insulation a limited distance from the cut ends. The cord is also looped around a looping mechanism (not shown) to provide a looped cord having a specific number of turns thereon. Also, in a different location of the station, the male 71 and female 72 connectors are injection moulded or secured to the stripped ends of the electrical wires 22 and 23 by suitable means, as is well known in the art. Therefore, at the output of the loop forming station comes an electrical cord 21 having a predetermined number of loops with a female and male connector at each end thereof, as shown by numeral 73. Each of these loops are of substantially the same length and a fastening means 74 is provided at the center of the loops so as to maintain the ends of the loops in substantially the correct position when removed from the loop forming mechanism. This loop of wire 73 is fed to the bar holding and loop application station 66 where the end portions of the electrical cord of one side of the loop are passed over respective cavities 62 in a mould bar 63 and properly positioned by means of cable cavities 67. After the cords of one end of this loop are placed over the cavities of a bar, the loaded bar 63 is then placed on an automatic feeding turret 75 at a first or second loading position 76 or 77 and the bar is fed automatically to a moulding station 78 where the upper mould cavity (not shown) of the bar 63 is secured and through which is injected the thermoplastic material. As the upper mould cavity (not shown) comes down over the lower mould cavity 62, the portion of the cord, immediately adjacent the double points 24 and 25 of the side and center contacts, respectively, is pressed down over the points by means of a stamping pin (not shown) thereby ensuring penetration of the double points into the cable to make contact with a respective one of the two conductor wires 22 and 23. Simultaneously, with this stamping, a plurality of pins come in contact with some of the elements 13, 16 and 19 positioned in the lower mould cavity to prevent these from shifting to retain them in the proper position to prevent bad contacts and consequently a defective lamp socket. When the upper part of the mould cavity (not shown) is retracted, the lamp socket 10 is formed and the side contact 13, center contact 16 and holding clip 19 are rigidly secured therein. Also, during retraction cycles holes 27 are formed extending through the socket base 12 of the lamp socket 10 by the extraction of the various pins and punch pins (not shown). As mentioned hereinabove, the purpose of these holes 27 is to provide improved ventilation in the socket to remove moisture or any water that may penetrate or form therein. When the next cycle is activated, the mould bars 63 are displaced by the clockwise rotation of the turret table 75. Thus, the bar 63 having the sockets 10 moulded on the cable 21 arrives at an unloading position 68 where the bar 63 is transferred to an extraction station 79 where the moulded socket 10 is automatically ejected out of the mould 63. The empty bar 63 is then conveyed to the accumulator 64 to serve in another cycle.

A synchronizing and control station 80 provides automatic cycle control for most of the operations. These operations are also synchronized to ensure a constant production flow. Also, the cycle time may be controlled to speed up or slow down the cycles or to switch to semiautomatic.

It is within the ambit of the invention to provide contacts 13 and 16 with single points in their lower edge instead of the double points 24 and 25 as herein described. Also, the materials herein disclosed for the construction of the cylindrical body 11, the contacts 13 and 16 and the holding clip 19 may be substituted by suitable equivalent materials. Still further, suitable means, although not described herein, are provided to identify each of the electrical wires in the cable. This is especially important during the assembly of the string of sockets so that the polarity is maintained constant throughout the string of lamp sockets.

I claim:

1. An electrical lamp socket *as claimed in claim 4 wherein there is further provided* [for lamp bulbs having a screw base, said lamp socket comprising a hollow cylindrical body having an open end and closed at the opposite end by a socket base integrally moulded with said cylindrical body, an electrical cable having two insulated conductor wires, said cable being moulded within said socket base, a center metallic contact having a contacting portion disposed substantially at the center of the inner face of said socket base, a retaining base portion integrally formed with said contact surface and moulded within said base to rigidly secure said center contact in said lamp socket and a point in the lower edge of said retaining base portion and penetrating said cable to contact one of said two wires, a metallic side contact of generally U-shape configuration having two opposed vertical sides and a connecting base, said side contact being partly embedded within said hollow cylindrical body and having undulations in the inner edge of each of said opposed vertical sides to engage and retain the screw base of a lamp bulb in said hollow cylindrical body and a point integrally formed in the lower edge of said connecting base and also penetrating said cable to contact said other one of said two wires,] a holding clip having a fixed end and a free end, said fixed end being provided with anchoring means which are moulded within said socket base to retain a portion adjacent said free end against the outer surface of said hollow cylindrical body to thereby retain a holding element between said holding clip and said cylindrical body.

2. An electrical lamp socket as claimed in claim 1 wherein a substantial portion of said free end is bent angularly outwardly from said cylindrical body and provided with an eyelet opening therein and elongated serrated flanges disposed on each side of said clip and extending in a direction towards said cylindrical body to rigidly retain said holding element between said clip and said cylindrical body.

3. An electrical lamp socket as claimed in claim 1 wherein said contacting portion of said center contact extends at substantially right angle to said retaining base portion and lies above and parallel to said socket base and positioned in an insulated manner between said two opposed vertical sides of said side contact above said connecting base of said side contact.

*4. An electrical lamp socket for lamp bulbs having a screw base, said lamp socket comprising a hollow cylindrical body having an open end and closed at the opposite end by a socket base integrally moulded with said cylindrical body, an electrical cable having two insulated conductor wires, said cable being moulded within said socket base, a center metallic contact having a contacting portion disposed substantially at the center of the inner face of said socket base, a retaining base portion integrally formed with said contact surface and moulded within said base to rigidly secure said center contact in said lamp socket and a point in the lower edge of said retaining base portion and penetrating said cable to contact one of said two wires, a metallic side contact of generally U-shape configuration having two opposed vertical sides and a connecting base, said side contact being partly embedded within said hollow cylindrical body and having undulations in the inner edge of each of said opposed vertical sides to engage and retain the screw base of a lamp bulb in said hollow cylindrical body spaced from the inner face of said body, a point integrally formed in the lower edge of said connecting base of said side contact and also penetrating said cable to contact said other one of said two wires, said socket base having at least two ventilating holes extending therethrough to provide ventilation about said screw base from said cylindrical body open end and through said base portion, said two ventilating holes being positioned one on a respective side of said metallic side contact.*

*5. An electrical lamp socket as claimed in claim 4 wherein said ventilating hole is disposed substantially parallel to the longitudinal axis of said socket.*

* * * * *